UNITED STATES PATENT OFFICE.

EDWARD SMALL, OF BALTIMORE, MARYLAND.

COMMINUTED SOFT SOLDER.

SPECIFICATION forming part of Letters Patent No. 280,967, dated July 10, 1883.

Application filed December 9, 1882. (No specimens.)

*To all whom it may concern:*

Be it known that I, EDWARD SMALL, a citizen of the United States, residing at Baltimore city, in the State of Maryland, have invented certain new and useful Improvements in Comminuted Soft Solder, of which the following is a specification.

The object of this invention is to provide an improved article of soft solder, such as tinsmiths employ, the improvement consisting in the shape in which the solder is made—to wit, comminuted, or in the form of small particles.

The soft solder to which this invention relates is that description of solder which is composed chiefly of tin and lead, and is designed for uniting adjacent edges or surfaces of tinplate in the manufacture of ware. Solder of this kind is usually made and sold in the form of ingots, cakes, bars, and rods, also in the form of wire. I now make it in the form of very small flakes and powder or dust, all of which shapes may be comprehended under the general term "comminuted." When in this form, the solder may be applied or distributed along the seam of the vessel to be soldered, and then by any suitable or known means the comminuted solder may be melted, thus effecting the union of the parts constituting the seam.

To produce soft solder in the described form, the alloyed metal must first be melted in a suitable receptacle, and then a small stream of the molten solder poured or dropped from the receptacle, and subjected to a strong blast of air driven crosswise of the stream, whereby the small stream of molten solder is broken and scattered into small particles, suitable means being employed to chill the same.

The apparatus and process which I employ for making this article of solder constitute the subject of another application for a patent, which will issue and bear even date with this.

What I claim, and desire to secure by Letters Patent of the United States, is—

The herein-described improved article, consisting of soft solder comminuted, or in the form of small particles, as set forth.

In testimony whereof I affix my signature in presence of two witnesses.

EDWARD SMALL.

Witnesses:
 JNO. T. MADDOX,
 JOHN E. MORRIS.